July 16, 1968     H. VATES     3,392,504

METHOD OF PACKAGING ARTICLES IN STRETCHED PLASTIC FOILS

Filed Dec. 12, 1963

United States Patent Office 3,392,504
Patented July 16, 1968

3,392,504
METHOD OF PACKAGING ARTICLES IN STRETCHED PLASTIC FOILS
Heinz Vates, Furth, Germany, assignor to Lever Brothers Company, New York, N.Y., a corporation of Maine
Filed Dec. 12, 1963, Ser. No. 330,080
Claims priority, application Germany, Dec. 14, 1962, F 38,556; Aug. 9, 1963, F 40,461
1 Claim. (Cl. 53—33)

ABSTRACT OF THE DISCLOSURE

Parts of non-plasticized uniaxially stretched plastic foil material are joined at an overlap therebetween of portions thereof by heat seals of which the length of each seal is in the stretch direction of each portion and is many times greater than the seal width. Articles are packaged by wrapping a sheet of such material thereabout and joining overlapping portions of such sheet by such seals. The seals are formed by transversely spaced parallel co-planar heated resistance wire sections saliently mounted on one side of a heating tool and pressed against the overlap.

---

Figure 1:
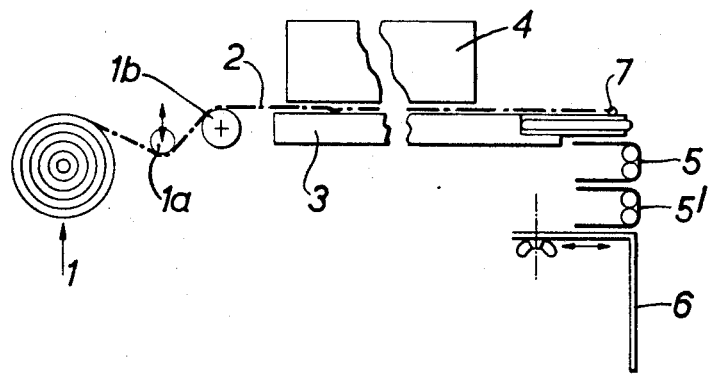

The invention relates to a method and apparatus for heat sealing, discontinuously, plastics foils which have been stretched in one direction, particularly uniaxially oriented polyvinyl chloride films.

It has been proposed to wrap articles, e.g. cardboard boxes and packs generally, in plastics films in order to protect the contents of the packs from environmental influences and then to secure the wrapper in place by joining the overlapping parts of the film. It is often desirable that the article wrapped should remain visible within its wrapper, and transparent films have been used. By using films which have a glossy surface, additional printing, stamping, colouring, etc., a pleasing appearance can be given to the packs.

For these purposes films of cellophane or cellulose hydrate have generally been used. The overlapping parts of these films have been joined by means of aqueous adhesives, but the adhesion is not very high. Cellophane films have the further disadvantage of being highly susceptible to moisture and permeable to water vapour. In order to decrease this susceptibility to moisture and permeability to water vapour, it has been proposed to coat the film on one or both sides with thin layers of a protecting lacquer. Such treated film can be joined by conventional heat sealing methods. However, this solution overcomes the above problems only to a small degree and has its own disadvantage that the lacquer layer necessitates a separate process step.

Polyvinyl chloride films however are substantially impermeable to water vapour and unsusceptible to moisture and consequentially have already been used for wrapping all kinds of goods. Although these films have the desired surface gloss, their transparency is less than that of the above mentioned cellophane films. To render the transparency of PVC film equivalent to that of cellophane film, the PVC film can be stretched in one direction, i.e. it can be uniaxially oriented, during manufacture. In this stretching process the mechanical properties, e.g. the tensile strength, is at the same time considerably improved.

Although aqueous adhesives are not recommended for sealing films, particularly for stretched PVC films, adhesives which contain organic solvents which will soften the PVC film, can be used. But most of these solvents have a characteristic smell which is easily imparted to the packed goods. Such organic compound based adhesives are therefore undesirable. Moreover the organic solvents evaporate quickly and make such adhesives almost impossible to apply in automatic packaging machines.

It is known to join unstretched plastics films, for example PVC films, by heat sealing and such joining does not cause difficulties. Hitherto the heat sealing of stretched films, particularly of non-plasticised stretched films, has not been practical because the films immediately shrink considerably and even tear when heat is applied during the sealing process. The temperature at which the shrinking of stretched plasticiser-free PVC film occurs is approximately 80° C. Sealing however is only effected at about 180° C.

It has been proposed that stretched films may be more readily sealed by the incorporation of a plasticiser, for example polyvinylidene-chloride copolymer containing a plasticiser. Adding plasticiser to films not only effects plasticisation but also lowers the softening point at which sealing can take place. Although the difference in temperature between the points at which shrinking and sealing take place is thus diminished, difficulties still arise during the sealing of stretched films containig plasticiser usually because during shrinking a certain amount of puckering of the film occurs in the vicinity of the seal and detracts from the appearance of the film.

As the plasticiser often migrates into the packaged articles, plasticised films are not recommended for the wrapping of foodstuffs. This disadvantage does not exist in the case of plasticiser-free plastics film, particularly uniaxially oriented non-plasticised PVC film, but the sealing of these non-plasticised films involves the above mentioned difficulties.

It has now been found that it is possible to heat seal stretched non-plasticised plastics films, particularly PVC films, if the non-plasticised films which are used have been stretched only in one direction.

If a film which has been uniaxially stretched is heated between two normal narrow oblong heating jaws the films act differently, depending upon whether the jaws lie in the same direction, or perpendicular to the direction, in which the film has been stretched. If the heat during sealing is applied perpendicularly to the direction of stretch the stretched film will still be sealed between the jaws since is is kept in this region by the pressure exerted on the jaws, but in the region around the edges of the jaws the film, although not being sealed, is also heated and thus softened. When a stretched non-plasticised film is concerned the film begins to shrink far below the sealing temperature and tears on both sides of the jaws, becoming perforated and yielding a non-protective wrapper.

Accordingly this invention provides a process of heat sealing together discontinuously, uniaxially oriented plastic films, in which the longitudinal axis of each seal is parallel with the direction of stretch and in which the ratio of length to width of each seal is large.

In this process the film is thus sealed between the jaws and during the sealing, softening occurs in the area of the jaws. Since a film which is uniaxially stretched expands perpendicularly to the direction of stretch the edges of the sealed area are now curled up only slightly and without tearing.

By this method it is possible on wrapping articles with plastics films uniaxially oriented, to join the overlapping portions of the film by heat sealing. In the sealing area good adhesion and a secure joint is obtained between the two ends of the film.

For the thermosealing of thermoplastic films it is customary to use a heat contact, heat impulse or high frequency method. In carrying out the method according to the invention the use of the heat impulse method is preferred. Normally in heat sealing processes two sealing tools are used, one or both of which are heated and between which the material is pressed together at a certain pressure. If the process is carried out with a single heated sealing element, a separate counter pressure or bearing surface has to be used. If however in carrying out the method according to the invention, e.g. in Banderoling, the overlapping parts of the film have to be sealed to each other, only one sealing tool is required. This tool is guided with the necessary pressure against the area of the film overlap to be sealed, the counter pressure being supplied by the package itself lying beneath it and only light pressure is thus needed.

A sealing device has already been proposed in which a plurality of spaced sealing elements are provided in the form of pointed tongues. As these tongues have only a small diameter the danger exists that the stretched films will tear during sealing with this known device thus nullifying the desired effect of the films. Moreover the sealed areas are very small so that a satisfactory joint between the overlapping ends of the film cannot be guaranteed.

A device for carrying out the method according to the invention obviates these disadvantages. The sealing tool comprises a plurality of separate sealing elements spatially arranged and adapted to bear upon the parts of the film to be sealed, in such a way that the longitudinal axis of each seal made lies parallel with the direction of stretch and the ratio of length to width of each seal is large. For carrying out the method using the heat impulse method, a sealing tool may be used which comprises a heating spiral of resistance wire. Advantageously the sealing tool is in the form of a flat spiral of wire wound upon a flat carrier in substantially parallel winding, the carrier being of ceramic or glass tubing. Preferably the carrier is such as may be cooled by having a suitable cooling medium flow through it.

With this tool only one of the surfaces of the sealing tool is used for sealing. A further embodiment of the device arranges resistance wire stretched parallel in a spaced arrangement over one side of a flattened tubular carrier of ceramic or glass, the wire passing to and from across the flattened face of the tubing. The wire passes round metal supports which are arranged alternately along two opposing edges of the flattened face.

Figure 2:
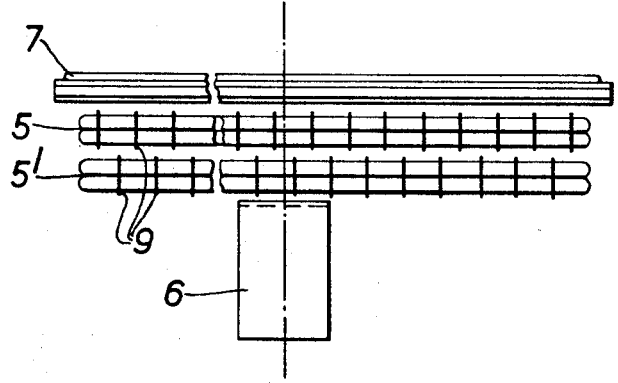
Figure 3:
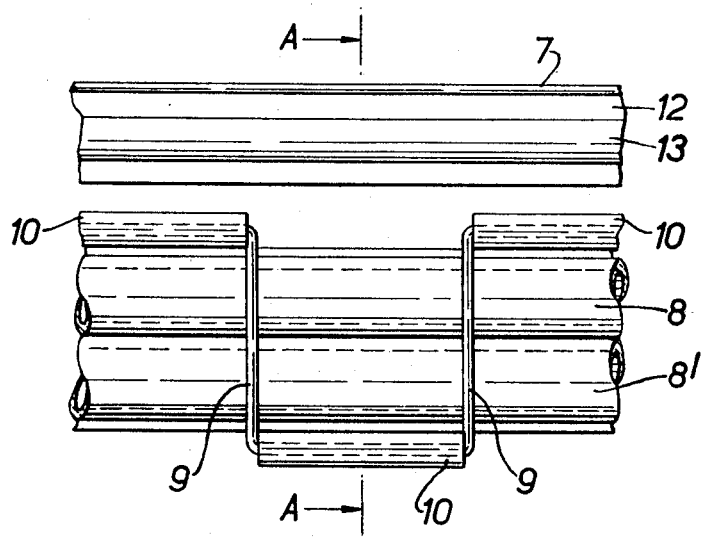
Figure 4:
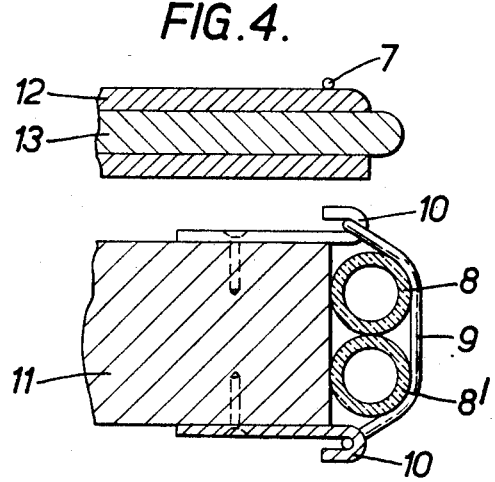
Figure 5:
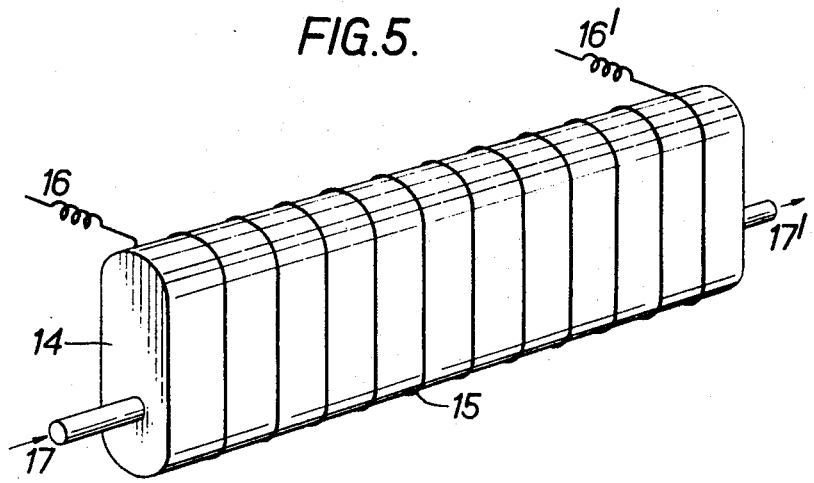

The two embodiments comprising the inventive method will now be described by way of example with reference to the accompanying schematic drawings in which FIGURE 1 shows a side elevation of one form of the apparatus, FIGURE 2 shows a front elevation of the apparatus of FIGURE 1, FIGURE 3 shows an enlarged portion of the preferred sealing tool, FIGURE 4 shows a section along line A—A in FIGURE 3, FIGURE 5 shows in perspective another embodiment of the sealing tool.

According to FIGURE 1 the apparatus comprises a film feeding device 1 on which a supply of non-plasticised polyvinyl chloride film 2 uniaxially oriented has been placed. The film 2 is guided via idler rollers 1a and 1b on to a table 3 on which the packs 4 are placed to be wrapped. The apparatus is provided with sealing tools 5 and 5' which may be placed in a row adjacent each other or in a plurality of superimposed rows, a spreader plate 6 against which the wrapped pack whose wrapper is to be heat sealed can be pressed, and a film separating device in the form of a heated wire 7 for cutting the right amount of the film 2 from the supply roll.

FIGURE 2 shows a front elevation of the apparatus with two sealing tools 5 and 5' superposed, the separate sealing elements 9 in each row being arranged in mutually staggered relationship. The preferred sealing tool is shown fragmentarily in FIGURES 3 and 4 in enlarged form and is constructed as follows. On the front of the plate 11 of nonconducting material, two glass tubes 8 and 8' are provided as carriers for the separate sealing element 9 stretched over them and through which a cooling medium can flow. On this plate 11 metal strips 10 arranged in staggered relationship are provided and the ends of the strips are bent in hook form protruding a small distance over the front of two opposite edges of the plate. The metal hooks 10 act as supports for the separate sealing elements 9 which pass to and fro on the front over the glass tubes 8 and 8'. These sealing elements 9 are formed of resistance wire which is guided round the metal hooks. These hooks cause the portions of the resistance wire lying upon them to be short circuited and only the portions acting as sealing elements 9 are heated during the passing of a current. Alongside the upper portion of the sealing tools 5 and 5' on the front side of the table 3 which is preferably provided with an inlaid rubber strip 13, an electrically heated separating wire 7 is stretched on a non-conducting material 12, this wire being kept under tension by means of a spring (not shown).

In operation a box 4 is placed approximately in the middle of the table 3 on film 2 which has been drawn forward upon the feeding device 1. The end of the film is folded over the box 4 after which the box and film is passed over the front 13 of the table. The box 4 is pressed against the spreader plate 6 moved into the appropriate position adjacent to the sealing tools 5 and 5' during which the overlapping parts of the film come to lie alongside the sealing tools 5 and 5'. By actuating a contact preferably by means of a pedal (not shown) with the help of a time relay a current flows through the sealing elements 9 and through the separating wire 7 thereby heating them. The required portion of film is thus separated from the supply and the sealing of the foil is effected.

FIGURE 5 shows another embodiment of the sealing tool. On the flat carrier 14 of ceramic or glass tubing, a spiral 15 of resistance wire is provided in parallel windings which are spaced apart about 5 to 10 millimetres. This resistance wire for example constructed of constantan has a diameter which is as small as possible, e.g. 0.4 millimetre. The length of the flat lying portion of the spiral is for example 5 to 10 millimetres. The spiral 15 is heated by means of electric current according to the heat impulse method via the terminals 16 and 16'. The carrier is such that a suitable cooling medium can flow through it from the inlet 17 to the outlet 17'. The sealing tool is equipped with means which make it possible to change the voltage and the length of the heat impulse in accordance with the resistance of the wire in order to render them adjustable to obtain the most suitable sealing temperature for the film in use.

It is apparent that the method is easily applicable in automatic packaging machines.

What is claimed is:

1. The method of packaging an article comprising, placing said article in registration with a sheet of nonplasticized plastic film which is uniaxially oriented by having been stretched during manufacture in one direction only and which is in the form of a web having a free end, wrapping an expanse of said sheet including said free end about said article to form therearound a film wrapper characterized by an overlap of film portions of which the direction of uniaxial stretch of each portion has the same direction of lie within the overlap as the direction of uniaxial stretch of the other portion, said overlap being in flat bearing relation with said article, pressing said overlap between said article and a plurality of external pressing elements moving relatively towards said article to each press said overlapping portions together at a localized region beneath that pressing element, each such pressing element having a longitudinal axis parallel to the direction of uniaxial stretch of said portion and being elongated in such direction by a factor of many times the width transverse to such direction of that element, applying heat from said pressing elements to said overlapped pressed-together regions of said film portions so as to form beneath each element and between said portions a heat seal which is shaped like such element to have a longitudinal axis parallel to the direction of uniaxial stretch of such portions and to be elongated in such direction by a factor of many times the width transverse to such direction of that seal, and heat severing said wrapped expanse of said web from the remainder of said web simultaneously with the forming of the heat seals between said overlapping film portions.

References Cited

UNITED STATES PATENTS

| | | | |
|---|---|---|---|
| 2,668,403 | 2/1954 | Rumsey | 53—30 |
| 2,992,958 | 7/1961 | Yamaguchi | 156—290 X |
| 3,033,257 | 5/1962 | Weber. | |
| 3,081,571 | 3/1963 | Dayen et al. | 156—290 X |
| 3,113,408 | 12/1963 | Kirkpatrick et al. | 53—30 |
| 2,999,042 | 9/1961 | Meister | 156—290 |
| 3,093,448 | 6/1963 | Kirkpatrick et al. | |
| 3,166,878 | 1/1965 | Pepitone et al. | 53—30 |

TRAVIS S. McGEHEE, *Primary Examiner.*